United States Patent Office 3,237,039
Patented Feb. 22, 1966

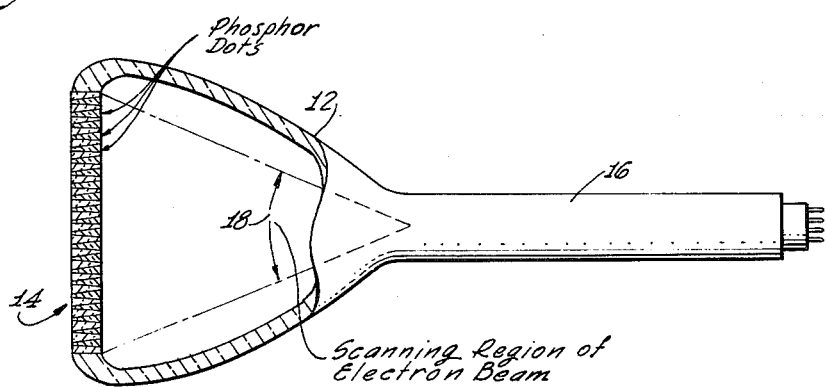
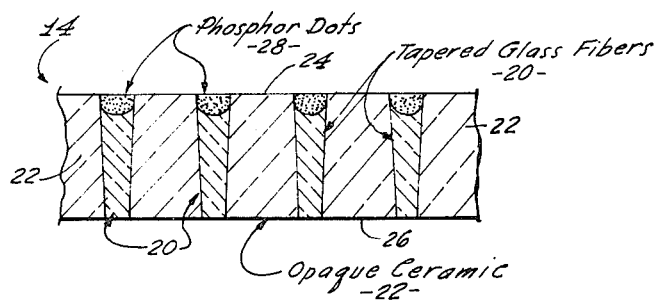
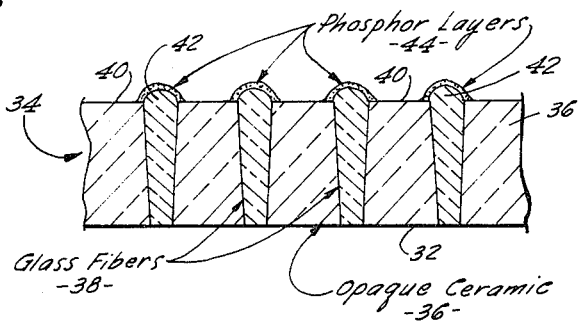

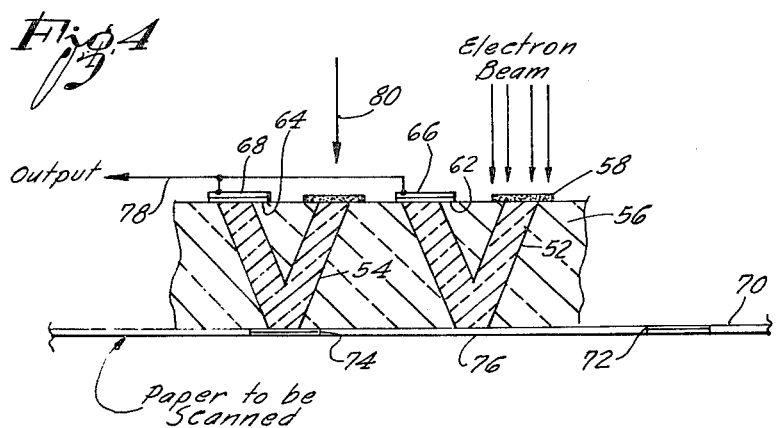
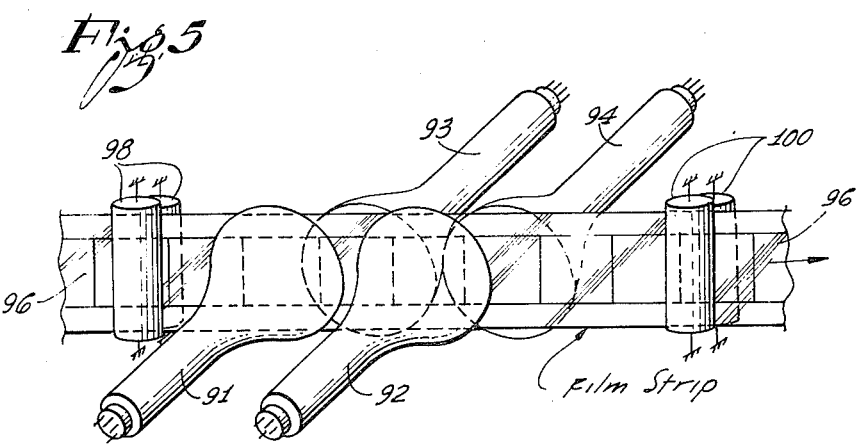

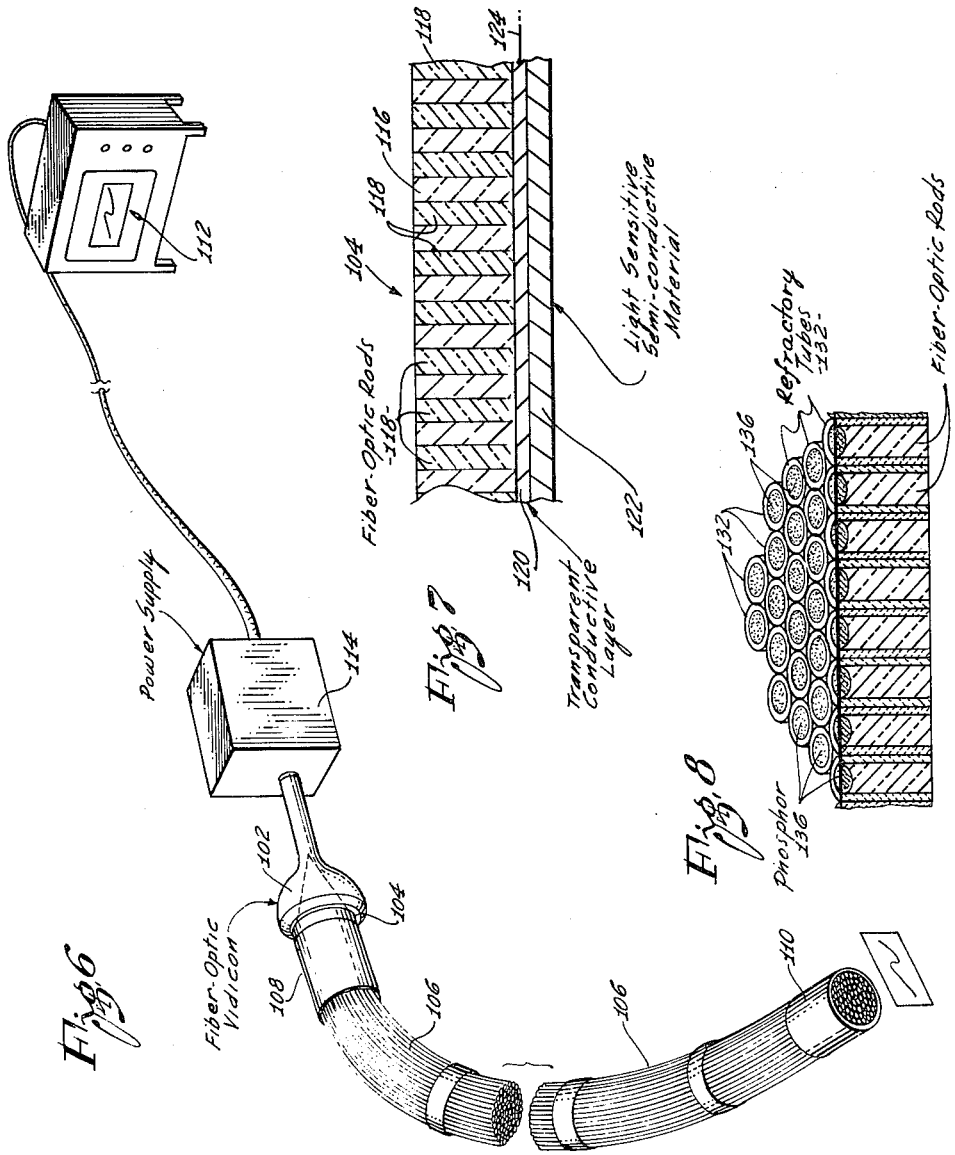

3,237,039
CATHODE RAY TUBE USING FIBER
OPTICS FACEPLATE
Norman F. Fyler, Menlo Park, Calif., assignor to Litton
Precision Products, Inc., a corporation of Delaware
Filed Apr. 17, 1961, Ser. No. 103,474
4 Claims. (Cl. 313—92)

This invention relates to cathode ray tubes of the type in which metal or transparent fibers extend through the faceplate of the tube, and to methods for making such tubes. In one specific aspect, this invention relates to cathode ray tubes of the "fiber optic" type in which transparent rods or fibers extend through the faceplate of a cathode ray tube. In accordance with another specific aspect, the invention relates to a high efficiency cathode ray tube for producing ultraviolet images.

In my patent application No. 83,330, entitled "Cathode Ray Tube," filed January 17, 1961, now abandoned, cathode ray tubes are disclosed in which discrete translucent fibers extend through the faceplate, such tubes have a number of advantages, including increased optical efficiency and high resolution. For applications in which conductive electric signals are to be obtained on the outer surface of a cathode ray tube in response to the sweeping of a cathode ray crossing the inner surface to the tube, an embodiment of the tube employing metal wires may advantageously be employed. Such tubes are disclosed in my patent application No. 16,734, filed on March 22, 1960, and entitled "High Speed Cathode Ray Direct Writing Tube," and one technique for making such tubes is disclosed in my other patent application Serial No. 83,330, cited above.

In accordance with the previous method, it was proposed that fiber-type faceplates for cathode ray tubes be formed by the bundling together of large numbers of rods and by engulfing of these rods in a matrix of glass, or the like, preferably black glass. This method, while satisfactory for the intended purpose, is somewhat less effective in obtaining high resolution than might be desired. In addition, it is difficult to obtain the high degree of packing of fibers which would be desirable. Up to the present time, it has been possible to obtain fibers extending through the cathode ray tube faceplates at a density of about a quarter of a million fibers per square inch of surface. This is adequate for a number of applications. However, it is desirable to have packing at a density of one million or up to several million fibers per square inch of surface area in order to obtain better resolution.

A principal object of the present invention, therefore, is to increase the density of packing of the fibers employed in cathode ray tube faceplates. Another object of the present invention is to significantly reduce the cost of preparing fiber optic faceplates or other faceplates in which fibers are employed.

In accordance with an important aspect of the present invention, these objects are achieved through the use of a photosensitive glass of a special type, as disclosed below in the body of this specification. This photosensitive glass has the property that, when exposed to ultraviolet light, it may be selectively etched. Thus, the portions of the glass which have been exposed to the ultraviolet light have a resistance to etching by certain acids which is fifteen to fifty times greater than that of the zones of the glass which have not been exposed to the ultraviolet light. In the preparation of a faceplate, therefore, a negative is prepared in which a large number of closely-spaced black dots are present. These black dots correspond to the desired pattern of fibers which will extend through the faceplate of the cathode ray tube. Following exposure of the plate to ultraviolet light passing through the negative, the material is etched with an acid, such as hydrofluoric acid, until the portions of the photosensitive glass which were not exposed to the ultraviolet light are etched away to produce a pattern of holes through the opaque glass plate.

The plate is then heat-treated for a specific period of time to form a ceramic material. This ceramic material has a very high melting point and an effective index of refraction which is relatively low. The next step in the process involves placing the ceramic plate in contact with molten glass. The liquid glass is drawn up into the small openings extending through the ceramic plate. After the glass has passed through the major portions of the openings through the ceramic plate, the plate is removed from the molten glass. The glass has a signifiicantly higher index of refraction than the effective index of refraction of the ceramic plate. Accordingly, the tiny rods of glass which extend through the ceramic plate form an effective set of fiber optic rods which couple one side of the plate with the other. In the completion of this form of the fiber optic plate, a layer of phosphor is applied to one side of the plate, and the resultant faceplate is sealed into a vacuum tube so that an electron beam may be directed at the phosphor material.

In another arrangement, the capillary action of the glass may be stopped before it penetrates completely through the openings extending through the faceplate. With this arrangement, the phosphor may be applied into the remaining portions of the capillary openings, and the excess phosphor may be removed with a squeegee. This structure is appropriate for use with transparent faceplates, providing that the index of refraction of the faceplate is significantly lower than that of the fiber optic rod.

In accordance with another arrangement to be discussed in detail below, two passageways may be etched through the glass plate to intersect at one surface of the faceplate. Many such V-shaped optical paths may be provided in the surface of a cathode ray tube faceplate. With the appropriate use of a phosphor material and a photoemissive, or other photosensitive material, printed material may be readily scanned by placing it in contact with the faceplate of the resultant cathode ray tube.

In accordance with a further embodiment of the invention, the glass may be forced by pressure through the capillary apertures with extra pressure just at the end of the process. This will produce round protrusions of glass on one side of the ceramic plate. When these rounded protrusions are coated with phosphor, a high level of light intensities is supplied to the fiber optic element, as the electron beam strikes the phosphor.

Turning to consideration of another problem which has been solved, in accordance with the principles of the present invention, there are certain types of film which are sensitive to ultraviolet light. As discussed in detail below, one such film is known as "Kalvar" film and it involves a plastic emulsion containing distributed diazo salts. When exposed to ultraviolet light, these salts release gas in proportion to the amount of light. Heating the film immediately after exposure makes the gas expand to form layers of tiny bubbles. These bubbles which prevent the direct transmission of light, through a scattering phenomenon, create the image on the film negative.

While this is a very simple process for obtaining a negative, as it only involves a simple heating step for developing, the required level of ultraviolet light intensity is quite high. In accordance with the present invention, the required high level of light intensity may be provided through the use of a phosphor having its principal light output in the ultraviolet portion of the spectrum, in combination with a fiber-type cathode ray tube faceplate. Furthermore, the light intensity may be increased through the use of fiber optic elements which protrude through the faceplate into the vacuum envelope, and which may therefore carry additional amounts of ultraviolet phosphor. With this type of structure as discussed above, higher levels of light intensity may be provided in the individual fiber optic elements.

The present invention enjoys many advantages over previously proposed methods and arrangements. Thus, for specific example, the invention avoids the necessity for handling a myriad of individual fiber elements. Instead, the elements may be formed in place by the capillary action discussed above. In accordance with the principles of capillary action of the molten glass in penetrating the holes in the faceplate, a wetting action takes place between the side-walls of the aperture and the molten glass. This insures cleanliness, a good vacuum seal following solidification of the glass, and prevents the inclusion of bubbles within the capillary tubes which would, of course, prevent high efficiency transmission of light.

In accordance with another aspect of the invention, fiber-type cathode ray tube faceplates may be made through a method involving a capillary action which is slightly different from the photosensitization and selective etching process discussed above. Thus, an extended array of short refractory tubes of capillary size may be held in a frame. The refractory array may then be floated on molten material, which fills the openings in the tubes and the interstices between tubes, by capillary attraction. The resultant fiber-type faceplate may be used in a display or a vidicon-type cathode ray tube, as disclosed in detail below.

In the preparation of the array of refractory tubes mentioned in the preceding paragraph, fine wires of aluminum or other metals forming a refractory oxide may be severely oxidized. The wires may then be bundled together, held in a frame, and cut into a flat plate-like array, perpendicular to the axes of the wires. The cores of the wires may then be removed by heat and mechanical action to provide the desired array of short refractory tubes of capillary size.

A further aspect of the invention involves the combination of a fiber optic vidicon tube with an optical cable made of fiber optic strands. When these components are employed in a suitable system with a large display tube, small images picked up at the probe end of the fiber optic cable may be greatly enlarged and intensified.

The novel features which are believed to be characteristic of the invention, both as to its organization and method of construction and operation, together with further objects and advantages thereof, will be better understood from the following description considered in connection with the accompanying drawing in which illustrative embodiments of the invention are disclosed, by way of example. It is to be expressly understood, however, that the drawing is for the purpose of illustration and description only and does not constitute a limitation of the invention.

In the drawing:

FIG. 1 shows a cathode ray tube having a fiber-type faceplate, in accordance with the present invention;

FIG. 2 shows one embodiment of the faceplate of the tube of FIG. 1 in greater detail;

FIG. 3 represents another embodiment of the invention in which special arrangements are provided for increasing the intensity of output light;

FIG. 4 shows an arrangement of the invention in which fiber optic elements are employed in a cathode ray tube to scan printed matter or the like, in accordance with the invention;

FIG. 5 shows schematically, a technique for exposing film through the use of a plurality of cathode ray tubes;

FIGS. 6 and 7 illustrate a system of the invention involving magnification of a fiber optic image; and FIG. 8 represents an alternative form of fiber-type cathode ray tube faceplate.

With reference to the drawing, FIG. 1 shows a cathode ray tube having an outer envelope 12. The cathode ray tube includes a fiber-type faceplate 14 and a gun structure (not shown) located within the neck 16 of the tube. The scanning region of the tube is indicated by the angle between a pair of dashed lines 18 in FIG. 1.

FIG. 2 is a detailed cross-sectional view through a portion of the faceplate 14 of FIG. 1. In FIG. 2 the glass fibers or rod-like elements 20 extend through tapered openings in the opaque ceramic faceplate matrix 22. The upper surface 24 of the faceplate is the vacuum surface and the lower surface 26 of the faceplate 14 is the viewing surface. Phosphor material 28 is located at the ends of the tapered rods 20 toward the inner surface 24.

In operation, the electron beam is directed to impinge on selected areas on the inner surface 24 of the faceplate 14. When the electron beam is incident on the phosphor dots 28, light is produced, and this light is transmitted through the fiber optic elements 20 to the viewing surface 26 of the faceplate. The phosphor material may be suitable for producing light in the visible spectral range or in the ultraviolet region. Various phosphor materials having the desired visible light or ultraviolet output are well-known to those skilled in the art. In this regard, for example, it is known that the silicate and berylliate phosphors have particularly high ultraviolet spectral emission characteristics.

The technique for fabrication of the faceplate shown in FIG. 2 is of considerable interest. The starting material for forming the main portion of the faceplate 22 is a photosensitive material of a particular type. It has the unusual property that exposure to ultraviolet light changes its properties. More particularly, following exposure to ultraviolet light, it becomes much more resistant to etching by certain acids. Thus, if during the exposure to ultraviolet light, particular zones are shaded from the light, these zones can be etched without significantly affecting the remainder of the material. In the case of the application shown in FIG. 2, a photographic negative may be provided which contains a number of small black dots. This negative is placed over the photosensitive plate 22 and collimated ultraviolet light is directed onto material 22 through the negative. The black dots in the photographic negative produce circular shaded zones which extend through thep late 22. During a subsequent step in the process, these zones are etched out, with little effect on the balance of the plate 22.

The photosensitive glass-like material is a product of the Corning Glass Company. It is known as "Photo Form" glass. It is described in some detail in an article entitled "Developments in Glass Technology" by Dr. J. K. Davis, which appears at pages 29, et seq. of Electronic Equipment Engineering for December 1958. Another article on this material is entitled "Chemical Machine of Photosensitive Glass" by Marshall Byer. This last-mentioned article appeared in the June 1956 issue of "Materials and Methods."

In practice, the Photo Form material is exposed to ultraviolet light for approximately three minutes. It is then etched with hydrofluoric acid of 5 to 10% or up to 20% strength for a few minutes up to about one-half hour, depending on temperature. During the etching process, the acid must be agitated. It has been determined that agitation by the use of ultrasonic techniques is to be preferred. Following the etching process, the material may be heated in various ways. If it is heated at a temperature of about 500°, the photosensitive properties are reactivated and the material becomes easier to etch once more. Under these conditions, it may be again exposed to ultraviolet light and additional areas which have been shielded from the ultraviolet light may be again selectively etched.

By heat treatment at a temperature of about 600° C. in air or an oxidizing atmosphere for several hours, the material becomes crystalline and ceramic in nature. The material is then termed "Photo-Ceram." It then has the high melting point and other characteristics of ceramic material.

The holes through the plate 22 of FIG. 2 may be of various shapes. For example, with regard to cross-section they obviously may be round, square or hexagonal by way of specific examples. The etching technique may be employed to determine the cross-sectional area from end-to-end of the etched openings. Thus, by etching only from one end, a continuous tapered opening may be formed. The taper is a result of the longer exposure to the acid solution of the portion of the hole to which the acid is initially applied. In the case of the holes shown in FIG. 2, for example, the etching was accomplished solely from the surface 24 of the plate 22. Accordingly, the holes have a diminishing taper from surface 24 to surface 26. When the etching is accomplished from both surfaces of plate 14, the holes taper from both ends to narrower regions adjacent the center of plate 14.

Following the preparation of holes through the plate 24, glass 20 must be introduced into the openings which have been prepared. This is preferably accomplished by capillary action of molten glass in penetrating the holes in the plate. In practice, a plate of aluminum oxide or other pure material which is not soluble in glass is placed within a vacuum chamber and glass is melted on the upper surface of the plate. The glass preferably has a high index of refraction. One typical glass which may be used is a crown borosilicate glass of a type known commercially as type 8395 having a high index of refraction of about 1.756. This is in contrast to the normal index of refraction of most common glass which is about 1.52. The apertured plates such as the plate 22 of FIG. 2 are floated on the molten glass. The entire system is enclosed in a vacuum chamber to insure cleanliness. After evacuation of the chamber, the aluminum oxide plate is heated until the glass melts. The glass will then start to penetrate and climb into the capillary openings through the plate 14. In one particular example where the plate was about 0.025 inch to 0.029 inch thick, four hours were required for completion of the capillary action.

Capillary action requires wetting of the sidewalls of the openings by the molten glass. This has a number of desirable advantages. First, bubbles in the molten glass tend to remain below the surface of the glass and the small openings act as a type of bubble filter, thus preventing access of bubbles or other impurities into the capillary tubes. The wetting action also produces a good seal between the glass and the ceramic which is necessary in the faceplate if it is to form part of the vacuum envelope of the cathode ray tube.

In one particular example, a 32 x 32 array of holes was formed. These holes each had a diameter of about 0.005 inch; they were located on 0.014 inch centers; and the ceramic plate was between 0.025 inch and 0.029 inch thick.

For fiber optic principles to be applicable, the transparent rods should have an index of refraction which is significantly higher than the index of refraction of the surrounding media. This is naturally true with glass fibers in air as the index of refraction of air is 1.0. Thus, with the index of refraction of glass being about 1.5 the necessary difference in refractive indices is present. In the present case the effective index of refraction of the surface of the ceramic material is about 1.5 and the index of refraction of the crown borosilicate glass is approximately 1.756. This difference in index of refraction is also suitable for providing the desired fiber optic effect. In this regard it may be noted that increased differences in index of refraction tend to prevent light transmission through the wall of the fibers to a greater extent. Thus, as the indices of refraction of the fibers and the adjacent medium approach one another, the light is not confined to the fiber to the desired extent. Specifically, the light which enters the fiber at a significant angle with respect to its sidewall will tend to pass though the interface more readily as the difference in refractive indices is reduced, in accordance with known optical principles.

The principles of the present invention are also applicable to fiber-type faceplates where metal fibers are employed. In this connection, reference is again made to my copending patent application No. 16,734. In the case of metal fibers, there is no problem of refractive index. However, in preparing a metallic fiber-type faceplate as in the preparation of a fiber optic faceplate, in accordance with the present method, the material forming the fiber must have a lower melting point than the melting point of the ceramic faceplate. This difference in melting point is preferably at least 100° C. so that the molten material may become truly fluid. In view of the changes in ambient temperature to which the cathode ray tube is normally exposed, the thermal coefficients of expansion of the fiber material and the faceplate should match within about 5%. If there are greater differences than this, the vacuum seal may be impaired by the temperature-induced stresses.

Consideration will now be given to certain other embodiments of the invention.

FIG. 3 shows an arrangement in which higher light intensities may be produced at the viewing or front surface 32 of the faceplate 34. In FIG. 3 the openings through the ceramic material 36 may be formed in the manner described above. However, the glass fibers 38 are subject to a particular method step. In this connection, the capillary flow of the molten glass through the ceramic material 38 is monitored closely. At the time when the glass just reaches the upper surface 40 in its flow from the lower surface 32, the plate 36 is subjected to a sharp momentary downward pressure toward the molten glass which is in contact with the surface 32. This produces the rounded protrusions 42 which appear at the upper end of each of the rods 38. Immediately after this step, the heat is removed and the glass rods are permitted to solidify in this form. Subsequently, the phosphor layer is applied to the rounded ends 42 of the fiber optic rods 38. These phosphor layers are designated 44 in FIG. 3. The phosphor layer may, of course, encompass the space between the protruding ends of the rods 38 in the inner surface 40 of the plate 34.

According to normal theory, phosphor material emits light equally in all directions. With the arrangement shown in FIG. 34, there is a much greater surface area for receiving phosphor material than in the situation where the glass rods have flat ends. Accordingly, a higher level of light intensity will be present within the fiber optic rods 38, than if flat geometries were employed. The phosphor material 44 may, of course, be of the ultraviolet light-emitting type for reasons which will be set forth in greater detail in connection with the embodiment of FIG. 5.

In the embodiment of FIG. 4, V-shaped fiber optic paths 52 and 54 are provided through the ceramic faceplate 56. Phosphor material 58, 60 is provided adjacent one end of each of the fiber optic channels. Photo-emissive or photoconductive material 62, 64 is provided adjacent the other end of each of the V-shaped fiber optic channels. Electrodes 66, 68 are provided in coupling relationship with the elements 62 and 64, respectively. The system of FIG. 4 is employed to scan the sheet of paper 70 which is placed in contact with the outer surface of the faceplate. As indicated by the darkened areas 72 and 74, the sheet 70 may bear printed material.

Scanning of the printed material on the sheet 70 may be accomplished by an electron beam in the following manner: An electron beam is initially applied to the phosphor material 58. The resultant light is transmitted down through light channel 52 onto the zone 76 on the sheet of paper 70. As this zone is not darkened as it does not bear any printed indicia, light is reflected from the area 76 of the paper 70 up toward the photosensitive material 62. This provides an output signal on electrode 66 and a corresponding output signal on conductor 78. When an electron beam is applied as indicated by the arrow 80, however, the resultant light is absorbed by the dark area 74 on the sheet of paper 70, no light is reflected toward the photosensitive material 64, and no output signal is produced. With a large number of closely-spaced V-shaped light channels of the type shown in FIG. 4, an entire sheet of paper may be scanned electronically and the resultant signals may be transmitted to a distant point.

The photosensitive material 62, 64 may take any of a number of forms. It may be electron emissive, for example. In this case, the electrodes 66 and 68 may be spaced at some short distance from the material 62, 64. Suitable arrangements, such as a leakage resistor, may also be provided to prevent the accumulation of positive charge on the elements 62, 64. Instead of electron emissive material, these elements 62, 64 may be of photoconductive material, and may serve to bridge a circuit between two conductors when light is incident upon the elements 62, 64.

The embodiment of the invention as shown in FIG. 5 relates to the exposure of film by the use of a series of cathode ray tubes 91 through 94. These four tubes may simultaneously impress four pictures on the film strip 96.

The film strip 96 may, for example, be a form of film known as "Kalvar." The Kalvar film 96 has an emulsion coating which contains dispersed diazo salts. When exposed to ultraviolet light, these salts release gas in proportion to the amount of light received. Immediately following exposure, the film is heated and this makes the gas expand to form layers of tiny bubbles. These bubbles create the photographic image on the film negative, as they scatter light which is directed through the film. This process is disclosed in an article which appers on pages 107 and 108 of the December 10, 1960 issue of Business Week and also in U.S. Patent No. 2,911,299, granted November 3, 1959. The film is available from the Kalvar Company of 909 South Broad Street, New Orleans 25, Louisiana.

The film strip 96 may be moved past the cathode ray tubes 91 through 94 by suitable arrangements such as the driving rollers 98 and 100. In operation, the film may be advanced for a distance approximately equal to the four frames which will be produced on the film by the cathode ray tubes 91 through 94. The cathode ray tubes may be of the ultraviolet fiber optic type as described hereinabove. Under these circumstances, the process may take place under ordinary artificial light conditions, as the normal ultraviolet ambient light level is sufficiently low so that no exposure of the film strip is produced. Following exposure by the tubes 91 through 94, the film may be heated to fix the image. Alternatively, the film may be heated to the proper temperature for fixing of the image while in contact with the cathode ray tubes, by heat from the cathode ray tube either by itself or as supplemented by additional heat. Other steps may then be taken in accordance with the disclosure of U.S. Patent No. 2,911,299 cited above.

The cathode ray tubes 91 through 94 may be of any of the types shown in FIGS. 1, 2 or 3 of the present invention, or may be of the types shown in my copending patent application No. 83,330 cited above. For use with Kalvar film, the phosphor must be of one of the known types producing high light levels in the ultraviolet spectral region. The physical arrangement as shown in FIG. 5 may also be employed to produce a series of images on film of other types. Thus, conventional photographic film may be employed. Under these circumstances, it would be desirable to maintain the unit of FIG. 5 in darkness or semi-darkness. In addition, the cathode ray tubes 91 through 94 would be provided with conventional phosphor material to produce high levels of light intensity in the spectral region of high sensitivity of the film which is employed.

The cathode ray tubes of the present invention may also be employed in systems as shown in FIG. 6. In the arrangement of FIG. 6, the cathode ray tube 102 is provided with a fiber optic faceplate 104. Tube 102 is of the vidicon type and is thus designed to pick up signals which are presented on the outer surface of the faceplate 104. Accordingly, the inner surface of the faceplate 104 is provided with a suitable transparent conductive film and a layer of semiconductor material. Then, when the electron beam is scanned across the inner surface of the cathode ray tube, the signal picked up on the transparent conductive layer will represent the light which is incident on the screen, as this light pattern produces a corresponding pattern of increased conductivity in the semiconductor material.

Light images are applied to the outer surface of the faceplate 104 through a flexible fiber optic cable 106. Such cables are well-known in the art and are made of a bundle of flexible transparent fibers. The ends 108 and 110 of the fiber optic cable are imbedded in a suitable plastic so that the fibers at the two ends maintain their proper relative position with respect to one another. Accordingly, light images which are picked up at the sensing end 110 of the fiber optic cable are presented with little loss at the outer surface of the faceplate 104 of the fiber optic vidicon tube 102.

For proper reproduction of detail observed at the viewing end of the fiber optic cable 106 the individual transparent fibers should have a diameter which is about 1/3 of the desired spot resolution. In practice, it is contemplated that the fiber optic elements will have a diameter of between five microns and 3/10 mil. The fiber optic elements in the faceplate 104 will have corresponding diameters, and will be packed as close together as practical. Thus, for example, the technique as shown in patent application No. 83,330 cited above may be employed. Alternatively, the techniques involving the capillary action of molten glass described in the present specification may be used, with the holes for receiving glass fibers being located very close to one another. To avoid loss by reflection at the surface where the end 108 of the fiber optic cable 106 engages the faceplate 104, both surfaces may be ground and polished. They are subsequently secured in intimate engagement with each other by known forms of optical cement.

A common use for fiber optic cables is to view the inner cavities of the human body. For these purposes the cable should have a diameter of from 1/16 inch to 3/4 inch, depending on the specific purpose. Because of the relatively small diameter of the fiber optic cable, it is desirable that the image be greatly magnified. This may be accomplished in accordance with one aspect of the present invention by the cathode ray tube 102 when employed in combination with a large cathode ray tube of the television type as indicated at 112 in FIG. 6. In practice, the electron beam of the vidicon tube 102 is swept in synchronism with the beam of the viewing cathode ray tube 112. The light pattern picked up by the vidicon tube is then employed to modulate the electron beam of the viewing tube. The power supply 114 may be employed to provide the proper control voltages to the vidicon tube 102 and to synchronize the sweep signals for the two cathode ray tubes. An enlarged view of the original image which is applied to the end 110 of cable 106 may then be observed on the viewing screen 112.

FIG. 7 is a detailed cross-sectional view of the faceplate 104 of the vidicon tube 102. The faceplate 104 includes a matrix material 116 which may, for example, be an opaque ceramic substance. Extending through the ceramic material 116 are a number of fiber optic rods 118. On the inner surface of the faceplate 104 are two additional layers 120 and 122. The layer 120 is a thin coating of a transparent conductive material such as tin oxide, for example. The layer 122 is semiconductor material which changes its conductivity in accordance with the level of incident light. The light 122 may, for specific example, be made of amorphous selenium, zinc sulfide or cadmium sulfide.

In operation, a pattern of light will be applied through the fiber optic elements 118 to the semiconductor material 122. When an electron beam is incident on an area of the semiconductor material, it becomes conductive, through exposure to light, and a signal derived from the beam current is produced on output lead 124 connected to the transparent conductive layer 120. When the beam strikes an area of the semiconductive layer 122 which is nonconductive because it is not illuminated, no signal appears on output conductor 124. Accordingly, as the electron beam is swept across the inner surface of the faceplate 104, the output signals provide an electrical representation of the image supplied to the outer surface 126 of the faceplate 104. These output signals are employed to modulate the electron beam of the viewing tube 112, thus producing an enlarged image of the original object which is being examined.

In the foregoing description various types of cathode ray tubes employing fiber optic faceplates have been described. In some cases, phosphor material has been employed to transform electron radiation energy into light energy. In other cases, light radiation is utilized to change the electrical characteristics of material on the inner surface of the fiber optic faceplate. Thus, for example, in the case of the vidicon tube of FIG. 6, light radiation was transformed into a pattern of conductive and nonconductive areas on the inner layer of semiconductor material. In each case, however, the radiation transducing material was mounted near the inner ends of the fiber optic elements on the inner surface of the faceplate.

FIG. 8 represents an alternative faceplate construction in accordance with the present invention. The faceplate of FIG. 8 includes a series of parallel, touching refractory tubes 132 perpendicular to the upper and lower surfaces of the faceplate. Suitable material such as glass or a conductive metal extends substantially through the tubes and fills the interstices between the touching tubes. By way of example, the refractory tubes 132 may have fiber optic rods 134 extending for the greater portion of their length. At the upper surface of the faceplate, as shown in FIG. 8, phosphor material 136 may be located at the ends of the fiber optic rods.

The faceplate of FIG. 8 may be constructed through the use of an array of oxidized aluminum wires. Following severe oxidation, the wires are bundled together as indicated in FIG. 8. The array of anodized or oxidized wires are then confined by a suitable frame arrangment (not shown) and cut to form a thin plate-like array. Following this step, the array is heated in an inert or reducing atmosphere to the melting point of aluminum. The aluminum forming the center of the wires is then forced from the tubes of oxide that originally encased each of the wires. This may be accomplished by vibration, ultrasonic treatment, or by jets of gas, either inert gas or gas from a torch. The original orderly array of aluminum wires with oxide coatings has now been converted into a corresponding orderly array of aluminum oxide tubes or pipes. The resultant mosaic of aluminum oxide tubes is now floated on molten material, either glass or metal, having a significantly lower melting point than the aluminum oxide, substantially as described above in connection with FIG. 2. In the case of glass, the glass material should have a significantly higher index of refraction than the effective index of refraction of the aluminum oxide tubes.

In tests which have been made employing a high index of refraction glass such as the crown optical glass mentioned above, a glass-to-metal seal was made with an anodized aluminum surface. In these tests evidence of total interior refraction was obtained. The criteria for forming fiber optic rods are therefore present, as the aluminum oxide surface obviously has an effective index of refraction which is significantly less than that of the glass. This surprising result obtains, despite the fact that aluminum oxide ($Al_2O_3$), in its various forms, is reported to have an index of refraction equal to or slightly exceeding the above mentioned glass.

It is to be understood that the above-described arrangements are illustrative of the application of the principles of the invention. Numerous other arrangements may be devised by those skilled in their art without departing from the spirit and scope of the invention. Thus, by way of example and not of limitation, the various forms of fiber type faceplates mentioned in the present specification, could be used in the various systems which are disclosed and in other known systems and electronic structures. Accordingly, it is to be understood that the present invention is to be limited only by the spirit and scope of the appended claims.

What is claimed is:

1. In combination, a vacuum tube having a faceplate, a plurality of fiber optic elements extending substantially through said faceplate, the inner ends of said fiber optic elements being convex, and phosphor material on the convex surfaces of said fiber optic elements.

2. In combination, a vacuum tube having a faceplate, a plurality of tapered fiber optic elements extending substantially through said faceplate, the inner ends of said fiber optic elements being convex, and phosphor material on the convex surfaces of said fiber optic elements.

3. In combination, a cathode ray vacuum tube having a faceplate, a plurality of V-shaped fiber optic light paths extending through said faceplate, each having both ends on the inner side of said faceplate and its point on the outer side of said faceplate, phosphor material located on the inner side of said faceplate adjacent one end of said fiber optic path and photosensitive material located adjacent the other end of said path.

4. A cathode ray tube comprising a faceplate, a plurality of pairs of light channels extending substantially through the faceplate, each said pair of channels having a common intersection with the outer side of said faceplate and having spaced intersections with the inner surface of said faceplate, means for directing light from the inner side of said faceplate through one of said pairs of light channels toward the outer side of the faceplate, and means mounted within the cathode ray tube for detecting light reflected back through the other of the pair of light channels.

References Cited by the Examiner

UNITED STATES PATENTS

| | | | |
|---|---|---|---|
| 2,137,806 | 11/1938 | Paige | 204—9 |
| 2,354,591 | 6/1944 | Goldsmith. | |
| 2,613,178 | 10/1952 | Grant | 204—9 |
| 2,681,382 | 6/1954 | Hilburn | 178—6.7 |
| 2,839,602 | 6/1958 | Fries | 178—6.7 |
| 2,903,378 | 9/1959 | Rychlewski | 117—33.5 |
| 2,979,632 | 4/1961 | MacNeille | 313—89 |
| 2,983,835 | 5/1961 | Frey | 313—89 |
| 2,985,784 | 5/1961 | MacNeille | 313—92 |
| 2,996,634 | 8/1961 | Woodcock | 313—92 |
| 3,017,228 | 1/1962 | Windsor | 117—33.5 |
| 3,027,477 | 3/1962 | Sheldon | 313—65 |

FOREIGN PATENTS 841,200   7/1960   Great Britain.

OTHER REFERENCES

The Glass Industry, 1961, page 455.

GEORGE N. WESTBY, *Primary Examiner.*

GEORGE R. OFELT, JOHN W. HUCKERT, *Examiners.*